Patented Aug. 26, 1952

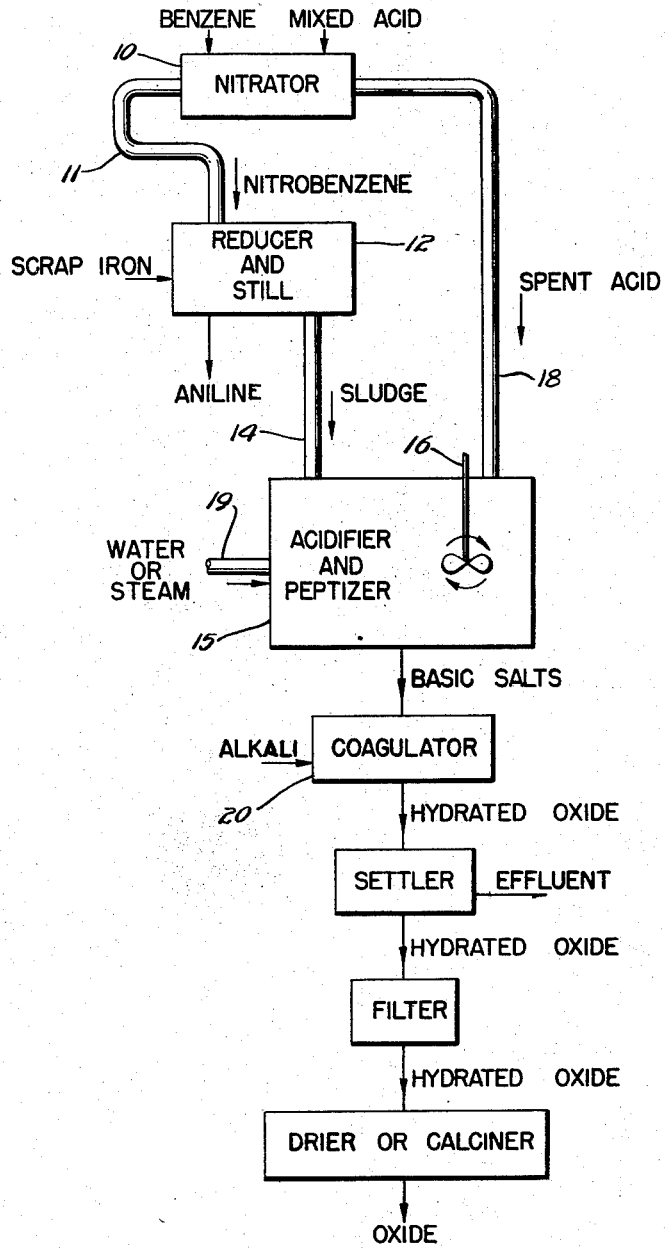

2,608,468

UNITED STATES PATENT OFFICE 2,608,468

METHOD OF PRODUCING FERRIC HYDRATE FROM ANILINE SLUDGE

Kennedy M. Nahas, Valley Cottage, N. Y.

Application May 14, 1948, Serial No. 27,046

10 Claims. (Cl. 23—200)

This invention relates to the production of oxides and hydrated oxides of the trivalent metals and more particularly to the molecular rearrangement and change in aggregation in an acid medium of the impure and dense grades of such oxides to a finely divided form suitable for pigments, adsorption or absorption systems, catalysts and the like.

One object is to utilize aniline sludge, which has heretofore been dumped at considerable expense as a waste product, for a source of iron oxide without the use of sufficient acid to combine with the total amount of iron pigment in the sludge, and yet without appreciable loss of iron.

Another object is to provide a cheap method for activating iron oxide minerals to render them suitable for the removal of sulfur compounds from gas.

Another object is to provide a process for the production of iron oxides of suitable quality for pigments and gas purification which utilizes by-products from the manufacture of aniline.

Aniline sludge is a mixture containing about 85–90% oxides of iron along with a little metallic iron with a small percentage of foreign matter and is formed during the reduction of nitrobenzene to aniline by scrap iron. In the past almost no attempt has been made to utilize the sludge even though iron oxide or hydroxide finds its way into many industries as a pigment, gas purifier and polishing abrasive, to mention only a few uses. The oxides as they exist in the sludge are not suitable for the trade as the sludge is not of the proper color, not sufficiently active as a gas purifier, and not uniform enough for a polishing material. Heretofore the sludge has been dumped as a waste product and at a plant where the annual sludge tonnage is about 15,000 tons the cost of its disposal is about $3,000. It has been proposed to dissolve the oxide and iron of the sludge in dilute sulfuric acid for the production of iron sulfates but this has not been considered feasible due to the competition from copperas as produced in the pickling of iron and steel. The leaching of the sludge with acids has likewise been attempted but has never produced a product having the required particle size and uniformity of color, to say nothing of purity.

My process briefly described comprises the addition of water to the sludge to form an easily agitated slurry, about half solids being suitable. The slurry is then digested with acid to form a plastic mass of oxides or basic salts.

While the mechanism of the reactions involved in my process is not wholly understood, the action appears to be a peptization of the large particles of black iron oxide by substantially less amounts of acid than are necessary to dissolve the iron oxide. It may also be that the mechanism involves a conversion of oxides to normal or basic salts which are subsequently more or less completely hydrolyzed to the ferric hydrates. Evidence of the latter action is seen when hematite (about 100–150 mesh) is subjected to agitation at about 90° with sulfuric acid and water and then washed. Such action produces a product which is quite similar in properties to the hydrated limonite.

My process involves the formation of ferric hydrate or ferric oxide of small particle size (as low as 5 to 15 microns) which is suitable as a paint pigment or as a gas purifier, using as raw material dark iron material and subjecting the material at elevated temperatures to the action of a dilute solution of acid in insufficient amount to dissolve the material. Said material may be impure iron oxide such as aniline sludge, scrap iron, rust or scale, hematite, bog iron ore of low sulfur absorbing activity, magnetite or other iron compounds having little or no strong acid constituent. As acidifying agents I may employ acids forming soluble normal salts such as sulfuric, nitric (especially when iron in the raw material has a valence of less than three) hydrochloric, acetic or even acid salts such as sodium bisulfate. When the iron of the raw material has a valence less than three, as for example a small portion of the iron in aniline sludge is free iron and ferrous iron, an oxidizing agent is preferably added, such as nitric acid or nitrates, chlorine, hydrogen peroxide, chlorites, hypochlorites. It will be apparent that certain materials may be employed both as acidifying agents and as oxidizing agents such as nitric acid or chlorine.

The factors of time period, proportion of acid to sludge, and temperatures are all interrelated and an increase in one will permit a reduction in one or more of the others.

It has been found that a temperature of about 90° C. is highly practicable if the system is not under pressure although the process may be carried out at temperatures as low as 50° C. Reaction and digestion time may be prolonged if desired but periods in excess of six hours, at least for small batches, are likely to prove uneconomical. Obviously there is no upper limit to the amount of acid that might be used for the treatment of a given amount of sludge since it could all be subsequently neutralized. However it appears that no particular advantage is to be realized by using more than about three fourths the amount of acid required to form normal ferric salts. Unless pressures above atmospheric are utilized, less than a tenth the amount of acid to form the normal salt results in reaction rate probably too slow to be generally economical.

Sulfuric acid is exceptionally good as the acid agent, perhaps because it forms readily soluble ferrous salts from the less highly oxidized forms of the iron in the sludge and because ferric sulfate readily hydrolyzes in hot water.

While the addition of an oxidizing agent, such as nitric acid is preferable, since it has been found that a higher proportion of nitric acid gives a lighter colored product, the oxidizing agent may be omitted and only sulfuric acid used. The resultant product is of lower quality but still suitable as a pigment and gas purifier. It is presumed that the air serves as an oxidizing agent.

Since it is possible to produce the desired form of oxide or hydrate by the use of dilute acid it is preferable, for the maximum economy of the process, to utilize spent mixed acid from the benzene nitrator of the aniline plant as a source of acid. This spent acid contains about 70% sulfuric acid and a very much smaller amount of nitric acid. It will be appreciated that similar spent acid, say from a cellulose nitrator, might conveniently be employed for activating other sources of iron such as hematite, though it is also to be noted that one outstanding advantage of my process is that it can be easily operated in connection with an aniline plant for it utilizes at least two by-products from the aniline plant, the sludge and the spent acid.

The product produced by the acid treatment alone is of light yellow color suitable, after water washing, as a pigment. Only about 15% of the iron remains in solution to be carried away with the acid and wash water and this may be recovered and returned to replace the water in making up the slurry. When gas purification grades are desired it is preferable that the peptized hydrate be coagulated with alkali. The alkali not only converts any dissolved ferric salts to the hydrate to prevent loss but, by the removal of the last traces of acid, suppresses the reducing action of hydrogen sulfide during the reaction between the latter and the hydrate or oxide. If the iron hydrate or oxide purifying agent contains acid and forms ferrous sulfide by the action of hydrogen sulfide the agent cannot be revivified in situ by air. However it is possible to produce as good a grade for gas purification by washing with water the product from the acid digestion to remove any free acid and to further hydrolyse even the basic salts, and then giving an alkaline wash to kill completely any trace of remaining free or combined acid, and finally if desired washing to remove soluble salts. Lime may also be used to kill the acid and is useful especially when used with soda ash solution to produce a good floc and aid in filtering. The initial water wash to remove free acid does permit some loss in the form of dissolved salts but the cost of the soda ash for complete precipitation is eliminated.

The accompanying drawing is a schematic representation or flow sheet showing how my process is especially suitable in conjunction with an aniline plant. Benzene and mixed acid are fed into a nitrator 10 in the usual manner for the production of nitrobenzene which is taken off by the pipe 11 and carried to a reducer and still 12. The nitrobenzene is reduced by the use of scrap iron, in the presence of a small amount of, say, hydrochloric acid (a few per cent of the theoretical amount) forming the iron oxide aniline sludge. In practice lime is subsequently added to decompose aniline hydrochloride and the aniline oil is steam distilled off and the sludge washed. Thus far the apparatus or aniline process as described is not novel except perhaps the washing of the sludge. The sludge is then carried by suitable means such as a duct 14 to a peptizer vessel 15 provided with an agitator 16 where water or acid wash water is added, if it has not been added previously, to make a slurry of the sludge containing about 50%–60% solids which will be thin enough to agitate without undue effort. Spent acid (about 70% $H_2SO_4$) is conducted by a conduit 18 to the peptizer 15 where, as described in more detail in the examples hereinbelow, the mixture is converted to a plastic mass of what appears to be basic sulfates. A steam pipe 19 may provide steam to the peptizer especially in the latter stages of the reaction for heat and agitation. Nitric acid is preferably added during the first half of the peptization stage, and may conveniently be added with the sulfuric acid.

If gas purifying oxide is desired the entire contents of the peptizer may be transferred to a coagulator or precipitating tank where a basic substance such as soda ash, caustic soda, ammonium hydroxide, ammonia, or even lime is added to give a pH of above about 8.5. It is preferably to employ such basic substances as will form readily soluble sulfates however. The hydrated oxide is then separated from substantially all the uncombined water and salts by conventional methods such as settling, filtering, washing and drying.

If pigment grade product is desired the amount of alkali used need not be as great. In fact the peptized basic salts without any addition of alkali, may be filtered as such and liberally washed to nearly complete hydrolysis. This of course means a partial loss of iron (about 15%) but the loss may be more than offset by the absence of cost of alkali.

In the following examples given by way of illustration, all parts are by weight and the aniline sludge is given on a dry basis. The sludge used was that of a typical aniline plant.

*Example I*

|  |  |  | Equivalent of pure acid per 100 lbs. sludge |
|---|---|---|---|
| Sludge | lbs | 100 | 100.0 |
| Spent sulfuric acid 70% | lbs | 45 | 31.5 |
| Nitric acid 45% | lbs | 26 | 11.8 |

The sludge was mixed with water to form a slurry containing about 50%–60% solids and agitated while the spent acid was added slowly over a period of about 20 minutes during which time the temperature rapidly rose to 90° C. The temperature was maintained at about 90° C. for the next hour and the mass allowed to digest after which the nitric acid was added over a 20–30 minute period. A temperature of about 90° C. was maintained for the next two hours and the mixture agitated. The mass swelled by at least a third and turned from black to black-brown, black-green, greenish-brown, brownish-yellow and finally to yellow.

A little water was added during the treatment to reduce the viscosity of the plastic-like mass and so permit better mixing.

Assuming the sludge to be $Fe_2O_3$, the acid used was less than one fourth the amount required for conversion to the normal salts.

The mixture was then transferred to a settling tank where soda ash was added until a pH of about 7.5 was obtained whereupon the precipitate was isolated by settling, filtering, washing and drying.

Example II

|  |  | Equivalent of pure acid per 100 lbs. sludge |
|---|---|---|
| Sludge | lbs 65.0 | 100.0 |
| Sulfuric acid 93% | lbs 57.0 | 81.5 |
| Nitric acid | lbs 24.2 | 26.0 |

Results similar to those of Example I were obtained in three hours and the sludge produced as extremely light yellow hydrated oxide of iron desirable for the manufacture of iron oxide pigments. One half of the yellow oxide was filtered from the acid system, water washed, dried, ground and bottled as pigment. A portion of this pigment type oxide, after being washed, was further washed with alkali to kill any remaining acid and then washed, dried, ground and bottled.

The other half was treated with soda ash to a pH of a little above 8.5 filtered, dried, ground and bottled for gas purification.

The excess acid used in this batch, while not necessary, did permit the shortened reaction period and in products of the highest quality both from a pigment and purification standpoint. Again assuming the sludge to be $Fe_2O_3$, the entire amount of combined acids was sufficient to convert only about 56% of the sludge to normal salts. Actually the other low valent forms of iron reduced at least a part of the nitric acid to gases and so destroyed its acid properties.

Example III

|  |  | Equivalent of pure acid per 100 lbs. sludge |
|---|---|---|
| Sludge, dry | lbs 60.00 | 100.0 |
| Spent acid 70% | lbs 42.00 | 49.0 |
| Nitric acid 70% | lbs 9.00 | 10.5 |

The sludge used was removed from the pit. It was sampled for moisture content in order to recalculate the total sludge used in the charge on the dry basis.

The sludge was transferred into the reaction vessel and water added to reduce solids to approximately 60%. Spent acid was added over a period of 23 minutes and the system allowed to digest. The swelling was apparent within an hour, water was added to reduce the swelling. At the end of the second hour the nitric acid was added over a ¼ hour period and the system allowed to digest. Steam was injected to keep the temperature at approximately 90° C. The system was cooled and agitation shut off at the end of the fifth hour and the mixture converted to a pH of 8.5 to give a brown product.

Example IV

|  |  | Equivalent of pure acid per 100 lbs. sludge |
|---|---|---|
| Sludge, dry (60 lbs. wet) | lbs 52 | 100.0 |
| Sulfuric acid 70% | lbs 30 | 40.5 |
| Nitric acid 70% | lbs 7 | 9.4 |

The sulfuric acid and nitric acid were added within the time described above on other batches. The swelling and all other characteristics of the system were so described above. The temperature was maintained at about 90° C.

Example V

|  |  | Equivalent of pure acid per 100 lbs. sludge |
|---|---|---|
| Sludge (dry basis) | lbs 100 | 100.0 |
| Spent acid 70% | lbs 45.5 | 31.8 |
| Nitric acid 40% | lbs 19.5 | 7.8 |

These materials were processed in a manner similar to that described of Example III except that the mass was not treated with alkali until it has been washed with water to remove a large part of the acid. The washed mass was then washed with alkali solution and finally freed of water soluble salts to give a brown product good for gas purification.

Kunberger gas purification tests on the final products showed an activity of from 185 to 265 sec. as compared with 125 sec. for corroded iron borings. The capacity likewise was more than twice as great as for corroded borings, ranging from 35% to 50% (corresponding to 96% theoretical) as compared with 23.5% to 25% for borings.

The greatest activity and capacity was obtained from the samples made with the largest amount of total acids or the longest periods of digestion.

Small scale operations show that the time of digestion, especially when small amounts of acid are used, can be materially reduced if the temperature and pressure are increased.

Ground hematite (about 150 mesh) was substituted for the sludge and processed with sulfuric acid alone under conditions simulating Example III to produce a gas purification grade of oxide.

Aniline sludge is not rapidly attacked by sulfuric acid (as the time periods in the above examples shown). Small scale experiments indicate that hydrochloric acid is more effective than sulfuric for the initial action in the process. However, the complete substitution of sulfuric acid by hydrochloric acid is not desirable because of the cost of the latter and the fact that more iron is lost during the washing of the peptized mixture as ferric chloride than as ferric sulfate.

An increase in rate of reaction may be effected by addition of a small amount of chlorides, forming soluble sulfates, to the spent acid or the sludge preferably at the beginning of the process. A small amount of sodium chloride equal to, say, about 5% of the weight of the sludge improves the activity without an undue loss of iron in the wash water.

After the peptized mass produced by any of the above sulfuric acid treatments was washed well with water a sulfate content as low as 3%–5% (dry basis) was obtained. This can be lowered further by a subsequent washing with a concentrated solution of a salt such as sodium chloride, potassium chloride, or sodium nitrate which does not form insoluble sulfates or insoluble normal iron salts. Advantage of the "mass action" effect is utilized to convert the ferric sulfate to say, a ferric chloride with the attendant formation of sodium sulfate. Thus, the treated product contains substantially only soluble impurities, if any, which may be removed by water washing or calcining. Lime water may be employed to completely decompose any occluded ferric chloride.

Many other variations are possible such as the treatment of the sludge with the sulfuric acid, with or without the addition of chlorides, to form a mass of oxides, basic salts, and normal salts.

Since there is considerable iron of a valence less than three in the sludge this mixture would be rich in ferrous iron. Then, if a nitrate salt be added, the ferrous iron would reduce the nitrate ion to a weaker acid forming radical, or even nitrogen or ammonia, to lower the acidity of the mixture thus increasing the decomposition of the iron salts to oxides or hydrates. Of course this reaction slows down as the mixture becomes less acid and high temperatures are especially desirable in the latter stages of the reaction.

The general process is applicable to the treatment of other substances for the production of oxides or hydrated oxides of metals or metalloids where surface activity is desired such as catalytic agents. Thus I may employ the same general method for preparing aluminum oxide catalysts for the catalytic cracking of petroleum. When clayey aluminum compounds such as bentonite are subjected to the acid treatment as in Example I a voluminous mass is formed in a similar manner to the formation of the basic iron salts. Other aluminum compounds such as the oxide or the hydroxides especially the partially dehydrated hydroxides may be used. Care should be taken if caustic alkalis are used to precipitate all the aluminum from the acid mixture lest the aluminum hydroxide be repeptized.

The invention claimed is:

1. A process for the production of ferric hydrate from an aqueous slurry of aniline sludge, said process comprising subjecting said slurry to the action of sulfuric acid at a temperature above 50° C. for a period of from two to six hours, the weight of sulfuric acid being between 30% and 85% of the weight of sludge on a dry basis and adding an oxidizing agent to the mixture during said period to oxidize all iron to the ferric condition, and then after said period adding to said mixture sufficient alkaline material until the resulting mixture has a pH of at least about 7.5, and separating the precipitated ferric hydrate from substantial amounts of liquid.

2. A process as in claim 1, said oxidizing agent being nitric acid.

3. A process as in claim 1, said temperature being about 90° C.

4. In the manufacture of ferric hydrate the process comprising intimately mixing at about 90° C. an aqueous slurry of aniline sludge containing about equal parts by weight of water and sludge with sulfuric acid the weight of the sulfuric acid being about 81.5% of dry weight of the sludge for a period of about three hours and during said period adding nitric acid in an amount about 26% of the weight of the sludge, and after said period washing the mixture to remove any free acid, and then adding soda ash to the mixture to reduce the acidity of the mixture to a pH of at least as great as 7.5 to convert soluble ferric salts to ferric hydrate, and finally washing out water soluble salts from the ferric hydrate.

5. A process for producing ferric hydrate suitable for gas purification comprising agitating and subjecting an aqueous slurry of aniline sludge to the action of sulfuric acid at a temperature above 50° C., the weight of sulfuric acid being between 30% and 85% of the weight of the sludge on a dry basis, continuing the action for between two and six hours and then washing the mixture with an aqueous liquid having a pH of at least 7 to hydrolyze ferric salts to ferric hydrate, and then separating the ferric hydrate from any substantial amount of liquid.

6. A process for producing ferric hydrate suitable for gas purification comprising agitating and subjecting an aqueous slurry of black iron oxide to the action of sulfuric acid at a temperature above 50° C. in the presence of an oxidizing agent, the weight of sulfuric acid being between 30% and 85% of the weight of the oxide on a dry basis, continuing the action for between two and six hours and then adding to the mixture aqueous alkaline liquid to hydrolyze iron salts to ferric hydrate, and then separating the ferric hydrate from any substantial amount of liquid.

7. A process for producing ferric hydrate suitable for gas purification comprising agitating and subjecting an aqueous mobile slurry of aniline sludge to the action of sulfuric acid at a temperature above 50° C. in the presence of an oxidizing agent, the weight of sulfuric acid being between 30% and 85% of the weight of the sludge on a dry basis, continuing the action at least two hours and at least until the resulting mixture becomes brown and then hydrolyzing ferric salts present in the mixture to ferric hydrate, and then separating the ferric hydrate from any substantial amount of liquid.

8. A produce for producing ferric hydrate suitable for gas purification comprising agitating and subjecting an aqueous slurry of aniline sludge containing about half its weight of water to the action of sulfuric acid at a temperature above 50° C., the weight of sulfuric acid being between 30% and 85% of the weight of the sludge on a dry basis, adding enough water to keep the mixture at least plastic, continuing the action for between two and six hours and at least until the resulting mixture becomes brown, and then adding to the mixture a basic aqueous liquid to hydrolyze ferric salts to ferric hydrate, and then separating the ferric hydrate from any substantial amount of liquid.

9. A process for producing ferric hydrate suitable for gas purification comprising agitating and subjecting an aqueous mobile slurry of aniline sludge to the action of sulfuric acid at a temperature above 50° C. in the presence of oxidizing agent; the weight of sulfuric acid being between 30% and 85% of the weight of the sludge on a dry basis, continuing the action for a period between two and six hours and until the resulting mixture becomes yellow and then washing the mixture with an aqueous basic liquid until the wash water from the mixture is faintly alkaline thereby converting ferric salts to ferric hydrate, and recovering the hydrate from the wash water, whereby a hydrate showing a Kunberger gas purification activity as high as 185 seconds and capacity as high as 35% is obtained.

10. A process as in claim 9, said alkaline liquid being a solution of sodium carbonate and the washing being continued until the wash water has a pH of about 8.5.

KENNEDY M. NAHAS.

REFERENCES CITED

The following references are of record in the file of this patent:

UNITED STATES PATENTS

| Number | Name | Date |
|---|---|---|
| 691,324 | Ramage | Jan. 14, 1902 |
| 1,428,521 | Bacon | Sept. 12, 1922 |
| 1,455,060 | Bacon | May 15, 1923 |
| 1,644,250 | Hart | Oct. 4, 1927 |
| 1,774,932 | Laux | Sept. 2, 1930 |

(Other references on following page)

UNITED STATES PATENTS

| Number | Name | Date |
|---|---|---|
| 1,888,464 | Lofland | Nov. 22, 1932 |
| 1,943,948 | Castner et al. | Jan. 16, 1934 |
| 1,953,201 | Tostereed | Apr. 3, 1934 |
| 2,247,624 | Wall | July 1, 1941 |
| 2,273,101 | Hakerland | Feb. 17, 1942 |

OTHER REFERENCES

Mellor: "Comprehensive Treatise on Inorganic and Theoretical Chem.," vol. 13, page 838 (1934); vol. 14, pages 304, 305, 313, 314 (1935); Longmans, Green & Co., N. Y. C.

Weiser: "The Hydrous Oxides," pages 55, 68, 69, 73, 74 (1926); McGraw-Hill, N. Y. C.

Milbourne: "Removal of $H_2S$ from Gas by Means of Iron Oxide with Special Reference to Humidity Conditions," pages 12 and 15. A Dissertation Submitted to the Board of University in Conformance with the Requirements for the Degree of Doctor of Philosophy, Baltimore, 1930.